US012595886B2

(12) United States Patent
Sohr et al.

(10) Patent No.: US 12,595,886 B2
(45) Date of Patent: Apr. 7, 2026

(54) CONTROL OF A WATER SUPPLY SYSTEM USING PUMPING STATIONS WITH RESOURCE OPTIMIZED PRESSURE AND FLOW TARGET VALUES

(71) Applicant: Siemens Aktiengesellschaft, Munich (DE)

(72) Inventors: Annelie Sohr, Munich (DE); Harald Held, Bockhorn (DE); Guido Hülsmann, Heroldsberg (DE)

(73) Assignee: Siemens Aktiengesellschaft, Munich (DE)

( * ) Notice: Subject to any disclaimer, the term of this patent is extended or adjusted under 35 U.S.C. 154(b) by 379 days.

(21) Appl. No.: 18/037,415

(22) PCT Filed: Nov. 2, 2021

(86) PCT No.: PCT/EP2021/080354
§ 371 (c)(1),
(2) Date: May 17, 2023

(87) PCT Pub. No.: WO2022/111950
PCT Pub. Date: Jun. 2, 2022

(65) Prior Publication Data

US 2023/0417371 A1 Dec. 28, 2023

(30) Foreign Application Priority Data

Nov. 27, 2020 (EP) .................................... 20210299

(51) Int. Cl.
*F17D 3/01* (2006.01)
*F04D 15/00* (2006.01)

(52) U.S. Cl.
CPC ................ *F17D 3/01* (2013.01); *F04D 15/00* (2013.01)

(58) Field of Classification Search
CPC ... F17D 3/01; F04D 15/00; E03B 5/00; E03B 7/02; E03B 7/075; G05B 13/042
See application file for complete search history.

(56) References Cited

U.S. PATENT DOCUMENTS 8,265,911 B1 * 9/2012 Wu .......................... E03B 1/00 703/6
2012/0316852 A1 * 12/2012 Blank .................... G06Q 50/06 703/6

(Continued)

OTHER PUBLICATIONS

B. Ulanicki, "Using a GAMS modelling environment to solve network scheduling problems", 1999, Found online URL :<https://journals.sagepub.com/doi/epdf/10.1177/002029409903200404> (Year: 1999).*

(Continued)

*Primary Examiner* — Kamini S Shah
*Assistant Examiner* — Jonathan Michael Skrzycki
(74) *Attorney, Agent, or Firm* — Schmeiser, Olsen & Watts, LLP

(57) ABSTRACT

A method for controlling distribution of pressure and flow in a water supply system which includes a plurality of pumping stations is provided, including: (a) reading in a computer-assisted hydraulic model of the water supply system, the hydraulic model mapping a time-dependent distribution of pressure and flow, (b) determining resource-optimized pressure and flow target values for the pumping stations for a specified forecast period using the computer-assisted hydraulic model by a first method of optimization, (c) reading in a pumping model behavior for a pumping station, the pumping model mapping an operational behavior of pumping devices of the pumping station, (d) determining resource optimized operating parameters for the pumping devices of the pumping station by the pumping model at a specified time by a second method of optimization, and (e)

(Continued)

outputting the resource-optimized operating parameters for controlling the pumping devices of the pumping station.

11 Claims, 3 Drawing Sheets

(56) References Cited

U.S. PATENT DOCUMENTS

| | | | | |
|---|---|---|---|---|
| 2014/0052421 | A1* | 2/2014 | Allen | G06F 30/20 703/2 |
| 2016/0103452 | A1* | 4/2016 | Kang | G05D 7/0635 700/282 |
| 2017/0299123 | A1* | 10/2017 | Fowler | F04D 15/0066 |
| 2021/0239123 | A1* | 8/2021 | Reismann | F04D 13/14 |
| 2024/0010537 | A1* | 1/2024 | Mauter | C02F 9/00 |

OTHER PUBLICATIONS

Coulbeck, B. et al.; "A Hierarchical Approach to Optimized Control of Water Distribution Systems: Part II. Lower-Level Algorithm"; Optimal Control Applications & Methods; vol. 9; pp. 109-126; XP055801186; DOI: 10.1002/oca.4660090202; 1988.

Burgschweiger, Jens et al; "Optimization models for operative planning in drinking water networks"; Optimization and Engineering; International Multidisciplinary Journal to Promote Optimizational Theory & Applications in Engin; Kluwer Academic Publishers; vol. 10; No. 1; pp. 43-73; XP019685910; ISSN: 1573-2924; 2008.

Coulbeck, B. et al.; "A Hierarchical Approach To Optimized Control of Water Distribution Systems: Part 1 Decomposition"; Optimal Control Applications & Methods; vol. 9; pp. 51-61; XP055801177; 1988.

PCT International Search Report corresponding to PCT International Application No. PCT/EP2021/080354 mailed on Feb. 7, 2022.

* cited by examiner

CONTROL OF A WATER SUPPLY SYSTEM USING PUMPING STATIONS WITH RESOURCE OPTIMIZED PRESSURE AND FLOW TARGET VALUES

CROSS-REFERENCE TO RELATED APPLICATIONS

This application claims priority to PCT Application No. PCT/EP2021/080354, having a filing date of Nov. 2, 2021, which claims priority to European Application No. 20210299.2, having a filing date of Nov. 27, 2020, the entire contents both of which are hereby incorporated by reference.

FIELD OF TECHNOLOGY

The following relates to a computer-implemented method and a device for controlling a distribution of pressure and flow in a water supply system, and a computer program product for the performance of the method.

BACKGROUND

Operation of a water supply system, such as for example a water network or a pipeline, calls for decisions about the operation at various levels. At the network or system level a central body generally specifies which pumping station in the water supply system should build up what pressure on the outlet side, in order to achieve the desired distribution of flow in the water supply system. In this case in particular the demands on the tanks as regards the permissible water levels, on the overall system as regards the permissible distributions of pressure, and on the pumping stations as regards the permissible consumption of energy are taken into account, and/or the forecast water usage by consumers has to be satisfied. Changes in the water levels in tanks in this case in turn affect the pressure behavior and/or flow behavior of the overall system. At the level of the individual pumping stations it is in particular necessary to decide which pumps should then actually be operated and at what speed, in order to build up the required outlet pressure. A water supply system is typically operated manually or on the basis of rules. This may however be resource-intensive.

Known from Coulbeck et al. 1988 *"A hierarchical approach to optimized control of water distribution systems: Part I Decomposition"* (OPTIMAL CONTROL APPLICATIONS & METHODS; vol.: 9; pp.: 51-61) and Coulbeck et al. 1988 *"A hierarchical approach to optimized control of water distribution systems: Part II: Lower-Level Algorithm"* (OPTIMAL CONTROL APPLICATIONS & METHODS; vol.: 9; pp.: 109-126; DOI: 10.1002/oca.4660090202) is a hierarchical approach to optimized control of water distribution systems, wherein it is proposed to split the system into different, hierarchically structured optimization levels: an upper level for the dynamic optimization of the reservoir, an intermediate level for the static optimization of source extraction and a lower level for the static optimization of the individual sources, wherein at each level the optimization results of the lower level are taken into account. Known from Burgschweiger et al. 2008 "Optimization models for operative planning in drinking water networks" (OPTIMIZATION AND ENGINEERING; INTERNATIONAL MULTIDISCIPLINARY JOURNAL TO PROMOTE OPTIMIZATIONAL THEORY & APPLICATIONS IN ENGIN; KLUWER ACADEMIC PUBLISHERS; vol.: 10; no.: 1; pp.: 43-73; XP019685910; ISSN: 1573-2924). Known from 2017/299123 A1 is an optimization of pump operation for pipelines for different types of liquid with different densities and viscosities, wherein efficient pumps are selected as a function of the respective type of liquid.

SUMMARY

An aspect relates to improving control of a water supply system.

A first aspect of embodiments of the invention relates to a computer-implemented method for controlling the distribution of pressure and flow in a water supply system which comprises a plurality of pumping stations, comprising the method steps:

(a) reading in a computer-assisted hydraulic model of the water supply system, wherein the computer-assisted hydraulic model is designed to map a time-dependent distribution of pressure and flow in the water supply system, (b) determining resource-optimized pressure and flow target values for the pumping stations in the water supply system for a specified forecast period using the computer-assisted hydraulic model by a first method of optimization, (c) reading in a pumping model for a pumping station, wherein the pumping model is designed to map an operational behavior of pumping devices in the pumping station, (d) determining resource-optimized operating parameters for the pumping devices in the pumping station using the pumping model at a specified time by a second method of optimization as a function of the pressure and flow target value of this pumping station for the specified time, and (e) outputting the resource-optimized operating parameters for controlling the pumping devices in the pumping station, wherein by the second method of optimization an efficiency value of the pumping station is determined, the computer-assisted hydraulic model (HM) is updated using the efficiency value of the pumping station and is used to determine the resource-optimized pressure and flow target values for the pumping stations in the water supply system.

"Computer-assisted" can be understood in connection with embodiments of the invention, for example, as an implementation of the method in which in particular a processor executes at least one method step of the method.

Unless specified otherwise in the following description, the terms "perform", "compute", "computer-assisted", "calculate", "establish", "generate", "configure", "reconstruct", etc. relate to actions and/or processes and/or processing steps which change and/or generate data and/or transpose the data into other data, wherein the data can in particular be represented or be present as physical variables, for example as electrical pulses. In particular the expression "computer" should be interpreted as broadly as possible, in order in particular to cover all electronic devices having data processing properties. Computers can therefore for example be personal computers, servers, programmable logic controllers (PLC), handheld computer systems, pocket PC devices, mobile radio devices and other communication devices that can process data on a computer-assisted basis, processors and other electronic devices for data processing.

"Module" can be understood in connection with embodiments of the invention, for example, as a processor and/or a storage unit for storing program commands. For example, the processor is specifically designed to execute the program commands such that the processor executes functions in order to implement or realize the method or a step of the method according to embodiments of the invention.

"Water supply system" can be understood in particular as a water supply network or a pipeline. The water supply system in particular comprises a plurality of pumping stations, which in turn comprise a plurality of pumps/pumping devices, and a plurality of tanks or receptacles. The values of the flows and pressures in the water supply system change in particular as a result of withdrawals by consumers and by filling the tanks, wherein however limit value fill levels should be adhered to.

"Hydraulic model" can be understood in particular as a computer-assisted model which maps a time-dependent distribution of pressure and flow in the water supply system as a function of the operation of the system. In particular it is possible, by the hydraulic model, to map the operational behavior of the pumping stations and receptacle facilities, the withdrawals from the system (by consumers) and/or the in-feeds from reservoirs. The hydraulic model in particular comprises models for all relevant components of the water supply system, such as for example pipes, tanks, outlets, reservoirs, valves, pumping stations. The hydraulic model may comprise simple analogous models in order to model respective pumping stations and in order to speed up optimization of the distribution of pressure and flow in the water supply system in embodiments. An analogous model can for example be a regression model. The pumping stations or the pumping efficiency/behavior thereof are thus not modeled in detail.

"Resource-optimized pressure and flow target values" can in particular be understood in connection with embodiments of the invention as pressure values and flow values for a pumping station, for compliance with which the pumping station is operated energy-efficiently/with minimal energy and/or cost-efficiently/cost-effectively.

A "method of optimization" can in particular be understood in connection with embodiments of the invention as a computer-assisted method of optimization. In particular, known methods of optimization can be used.

A "pumping model" can be understood in particular as a pump curve or pump characteristic which describes the operational behaviors of a pumping device. The pumping model in particular describes the characteristics of a pump as regards hydraulics and efficiency. A pump characteristic for example represents the ratio between a delivery head and a delivery flow.

An "operating parameter" for a pumping device can for example be understood as an operating state, such as for example "On"/"Off" (switched on/off), and/or a speed at which the pumping device is operated.

It is an advantage of embodiments of the present invention that it enables the energy-efficient and/or cost-effective operation of the water supply system. By a first method of optimization, optimized pressure values and flow values for individual pumping stations in the water supply system are ascertained at an upper/first optimization level. This first optimization may take place for a specified forecast period in embodiments. Then at a lower/second optimization level a resource-optimized operation of the individual pumping devices in the respective pumping stations is ascertained by a second method of optimization as a function of the previously determined optimized pressure values and flow values of the respective pumping station. This second optimization may take place at a current time in embodiments. In particular, during the second optimization it is possible initially to determine which pumping devices in a pumping station should be operated.

The problem of optimization is thus solved at two levels. In addition, the pumping stations in the water supply system can be modeled in less detail/in outline during the first optimization step, for example by analogous models. A detailed modeling takes place in the second optimization step. Thus, on the basis of a forecast for the operation of the water supply system, operating parameters for the operation of the pumping devices in a pumping station can be determined at the current time.

The hydraulic model can be updated as a function of the results of the second method of optimization. In particular, a regression model of a respective pumping station can be updated in this way. Thus, it is additionally possible to achieve a consistency between both the optimization levels.

In an embodiment of the computer-implemented method the resource-optimized pressure and/or flow target values of the pumping station can be used as boundary conditions for the second method of optimization.

Thus, a consistency between both the optimization levels can be achieved by transferring the flow and pressure target values from the upper to the lower level.

In an embodiment of the computer-implemented method the operating parameters for the pumping devices can be determined such that the resource-optimized pressure and flow target values of the pumping station are satisfied at the specified time.

Thus, the result from the first optimization can be used to optimize the operational behavior of the pumping devices in the respective pumping stations in detail.

In an embodiment of the computer-implemented method, individual pumping devices in the pumping station can be selected as a function of the determined pressure and flow target value of this pumping station and resource-optimized operating parameters can be determined only for the selected pumping devices.

In an embodiment, only a specific number of pumping devices in a pumping station is taken into operation in order to achieve a resource-optimized operation.

In an embodiment of the computer-implemented method the method steps (c) to (e) can be performed for each pumping station in the water supply system.

In an embodiment, the second optimization is performed for each pumping station, so that resource-optimized operating parameters are determined for pumping devices in each pumping station.

In an embodiment of the computer-implemented method the method steps (b) to (d) can be iterated after a specified time step.

It is thus possible to react quickly to dynamic changes in the water supply system. For the second optimization step at a current or specified time use is therefore made of a current forecast from the first optimization step.

In an embodiment of the computer-implemented method, pumping stations in the water supply system can be mapped in the computer-assisted hydraulic model of the water supply system by analogous models.

In particular, an operational behavior, for example a pumping efficiency, of a pumping station can be mapped by an analogous model. In embodiments, the pumping stations may thus not be modeled in detail at the upper optimization level, but are mapped by less complex models.

In an embodiment of the computer-implemented method, the pumping model can comprise pump characteristics of the pumping devices.

In an embodiment of the computer-implemented method, the pumping devices in the pumping station can be controlled by the resource-optimized operating parameters.

A further aspect of embodiments of the invention relates to a device for controlling a distribution of pressure and flow in a water supply system which comprises a plurality of pumping stations, comprising:

- a first interface, which is designed so as to read in a computer-assisted hydraulic model of the water supply system, wherein the computer-assisted hydraulic model is designed to map a time-dependent distribution of pressure and flow in the water supply system,
- a first optimization module, which is designed to determine resource-optimized pressure and flow target values for the pumping stations in the water supply system for a specified forecast period using the computer-assisted hydraulic model by a first method of optimization,
- a second interface, which is designed to read in a pumping model for a pumping station, wherein the pumping model is designed to map an operational behavior of pumping devices in the pumping station,
- a second optimization module, which is designed to determine resource-optimized operating parameters for the pumping devices in the pumping station using the pumping model at a specified time by a second method of optimization as a function of the pressure and flow target value of this pumping station for the specified time, and
- an output module, which is designed to output the resource-optimized operating parameters for controlling the pumping devices in the pumping station, wherein by the second method of optimization an efficiency value of the pumping station is determined, the computer-assisted hydraulic model (HM) is updated using the efficiency value of the pumping station and is used to determine the resource-optimized pressure and flow target values for the pumping stations in the water supply system.

Embodiments of the invention further relate to a computer program product (non-transitory computer readable storage medium having instructions, which when executed by a processor, perform actions), which can be loaded directly into a programmable computer, comprising program code sections, which when the program is executed by a computer cause the computer to execute the steps of a method according to embodiments of the invention.

A computer program product can for example be provided or supplied by a server in a network on a storage medium, such as for example a memory card, USB stick, CD-ROM, DVD, a non-transitory storage medium or else in the form of a downloadable file.

BRIEF DESCRIPTION

Some of the embodiments will be described in detail, with reference to the following figures, wherein like designations denote like members, wherein.

DETAILED DESCRIPTION

In particular, the following exemplary embodiments only show exemplary realization options for what in particular such realizations of the teachings might look like, since it is not possible, nor expedient or necessary for the understanding of embodiments of the invention, to mention all these realization options.

Also, in particular all standard options in the conventional art for the realization of embodiments of the invention are of course known to a person skilled in the conventional art who is aware of the method claim(s), such that in particular there is no requirement for a separate disclosure in the description.

Figure 1:
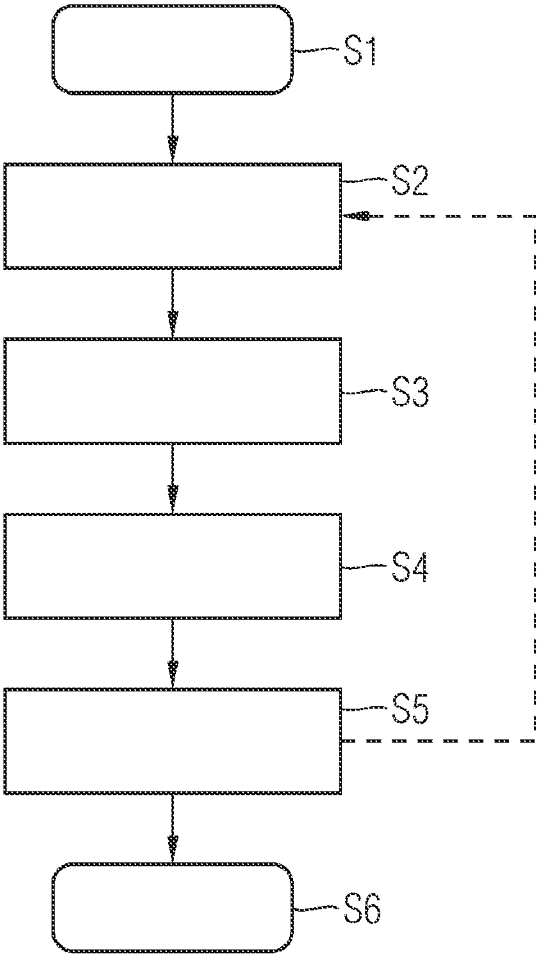
FIG. 1 shows an exemplary embodiment of a method.

FIG. 1 shows an exemplary embodiment of a method for controlling the distribution of pressure and flow in a water supply system as a flow diagram. The water supply system comprises a plurality of pumping stations, each of which comprises a plurality of pumps/pumping devices, and receptacles, in order to regulate pressure and flow throughout the system, such that the pressure and flow satisfy target values at the consumer end.

In the first step S1 of the method a computer-assisted hydraulic model of the water supply system is read in. The computer-assisted hydraulic model maps a time-dependent distribution of pressure and flow in the water supply system. In embodiments, the hydraulic model may in each case comprise analogous models, also referred to as efficiency models, of the respective pumping stations in the water supply system. These analogous models can be used to map the operational behavior of the pumping stations. An analogous model can for example be a regression model.

In the next step S2 of the method resource-optimized pressure and flow target values for the pumping stations in the water supply system are determined for a specified forecast period using the hydraulic model and by a first method of optimization. Thus, in this case a longer period is taken into account, in order for example to map the use of the receptacles correctly. The receptacles represent a storage capacity which allows the provision of the water and the withdrawal thereof by the consumers to be decoupled. Only in this way is it possible to protect against consumption spikes. Furthermore, in the face of variable energy prices the pumps can be switched to more cost-effective time windows.

In other words, the distribution of flow and pressure for the water supply system is optimized using the hydraulic model, for example, starting from a current time in embodiments, for a specified period. The determined time-resolved pressure and flow target values for the pumping stations in the water supply system are output.

In the next step S3 at least one pumping model for at least one pumping station is read in. A corresponding pumping model may be read in for each pumping station in the water supply system in embodiments. A respective pumping model is designed to map an operational behavior of pumping devices/pumps in the pumping station. A pumping model can for example comprise a pump characteristic or pump curve for a pumping device.

In the next step S4 operating parameters which are resource-optimized for a specified time for the pumping devices in the pumping station are determined using the pumping model by a second method of optimization as a function of the pressure and flow target value of this pumping station for the specified time. The second method of optimization can in this case for example also be identical to the first method of optimization. The resource-optimized operating parameters may be ascertained at a current time in embodiments. To this end, in embodiments the resource-optimized pressure and/or flow target values of the pumping station in question can be used as a boundary condition for the second method of optimization. Thus, the calculation results from the first optimization step S2 can be used for the detailed optimization of the operational behavior of the individual pumps in a pumping station. In particular, the operating parameters for the pumping devices are determined such that the previously determined, resource-optimized pressure and flow target values of the respective pumping station are satisfied at the specified time.

In the next step S5 the resource-optimized operating parameters for controlling the pumping devices in the respective pumping station, and thus for controlling the water supply system, are output.

Steps S3 to S5 of the method may be performed for each pumping station in the water supply system in embodiments. In particular, it can in each case be ascertained here which of the pumping devices in the respective pumping station should be activated. In other words, individual pumping devices in a pumping station can be selected as a function of the determined pressure and flow target value of this pumping station and resource-optimized operating parameters are determined only for the selected pumping devices.

Additionally, the hydraulic model or the analogous models/efficiency models can be updated by the optimization results from steps S3 to S5, in order to adapt these to a dynamic behavior of the water supply system.

In embodiments, the method steps S2 to S5 can in particular be repeated for a subsequent forecast period after a specified time step.

In the next step S6 of the method the pumping devices in the pumping stations can be controlled in accordance with the determined resource-optimized operating parameters. In the event of a renewed iteration of the method steps S2 to S5 updated operating parameters can accordingly be output.

Figure 2:
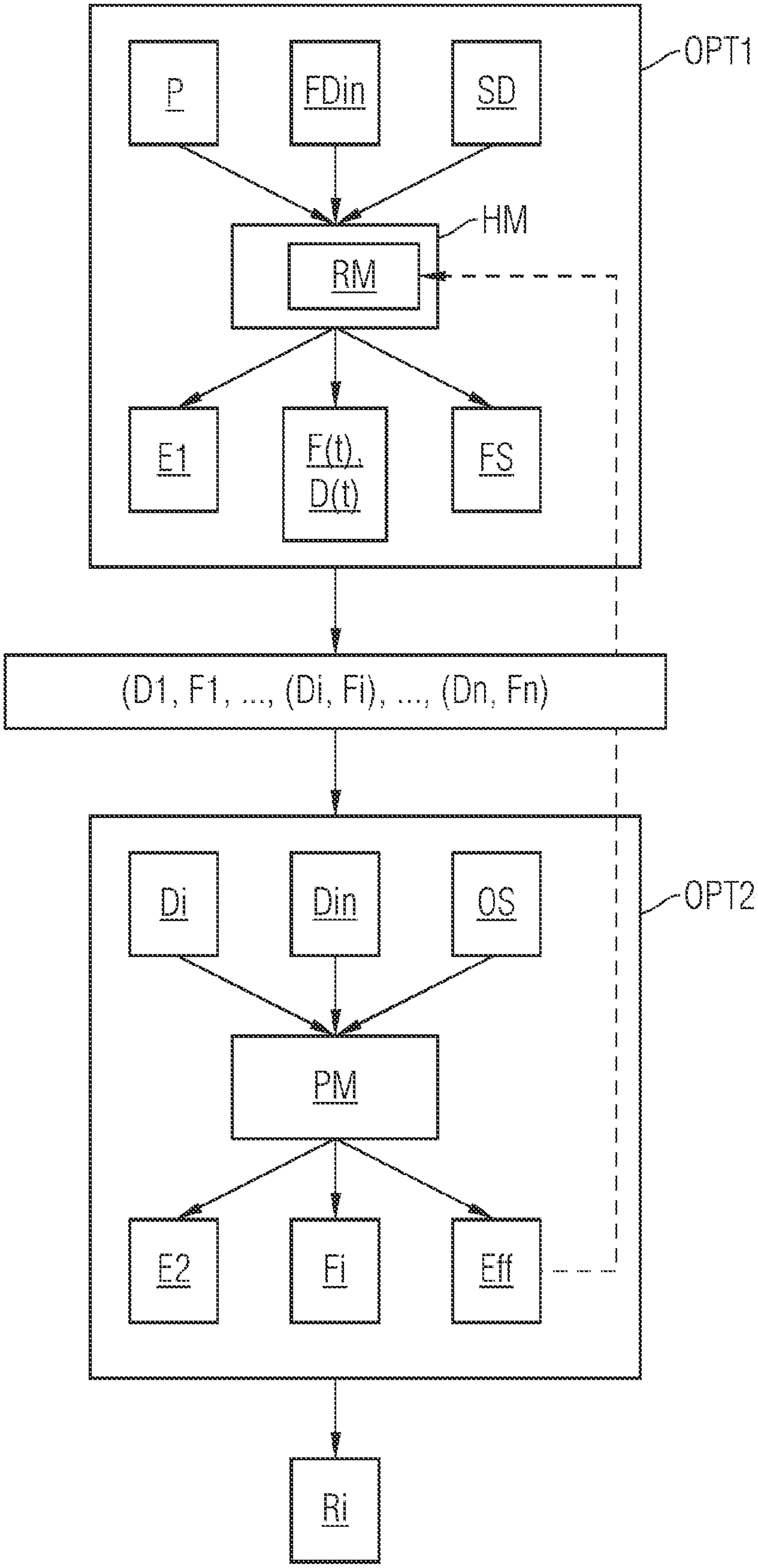
FIG. 2 shows a further exemplary embodiment of the method.

FIG. 2 shows a further exemplary embodiment of a method for controlling the distribution of pressure and flow in a water supply system in a block diagram.

In the depicted embodiment, the method comprises two optimization levels. At the first optimization level optimized pressure and flow target values ((D1, F1, . . . , (Di, Fi), . . . , (Dn, Fn)) for i=1, . . . n pumping stations in the water supply system are determined by a first method of optimization OPT1. In embodiments, the method of optimization OPT1 is to this end applied to a computer-assisted hydraulic model HM which maps a distribution of flow and pressure in the water supply system.

For this, time- and location-resolved forecast values P of withdrawals/consumers are transferred to the hydraulic model HM. Additionally, time-resolved flow values and outlet pressures FDin of the pumping stations in the water supply system and current status data SD of receptacles at the start time of the forecast, such as for example fill levels of reservoirs, are transferred to the hydraulic model HM.

The hydraulic model HM comprises at least one regression model RM of a pumping station in the water supply system, wherein the regression model RM describes the efficiency of the pumping station.

With the hydraulic model HM, flows F(t) and pressures D(t) in the water supply system that are time-resolved for a specified forecast period can be used to determine the energy requirement E1 for the regulation of the flows and pressures and receptacle fill levels FS. In other words, the hydraulic model HM comprises the dynamic behavior of the water supply system over the forecast period.

Using the hydraulic model HM, resource-optimized pressure and flow target values ((D1, F1, . . . , (Di, Fi), . . . , (Dn, Fn)) for the respective pumping stations in the water supply system are calculated for the specified forecast period by the first method of optimization OPT1. For this, the flows and outlet pressures of the pumping stations, i.e., the optimization variables, are ascertained in the forecast period, such that the flows and pressures in the water supply system at all times comply with restrictions (boundary conditions of the optimization) and receptacle fill levels remain within specified limits, and the energy requirement and/or the costs are optimal. The energy requirement and/or the costs are accordingly the target function of this optimization.

The pressure and flow target values ((D1, F1, . . . , (Di, Fi), . . . , (Dn, Fn)) for the respective pumping stations in the water supply system that are determined in this way are provided for the second optimization. The second optimization step may be performed for each pumping station in embodiments. The second optimization step may be performed for a current time and/or the time for which a specific control decision is pending as regards the operation of the pumps in embodiments.

A pumping model PM is provided for each pumping station (i=1, . . . , n), and for example comprises at least one pump characteristic for a pump. The pressure target value Di, which was ascertained in the preceding optimization step for this pumping station, is transferred to the pumping model PM as an outlet pressure for the time in question. Additionally, an inlet pressure Din of the pumps in the pumping station and information about the operational status OS of the pumps is transferred to the pumping model PM. By the pumping model a flow, an energy requirement E2 and an efficiency value Eff of the pumping station can be determined.

By the second method of optimization OPT2 an operational status of the pumps (optimization variable) can be ascertained, such that a flow value reaches at least the flow target value Fi of the pumping station from the first optimization step for the time in question and in this case the energy requirement of this pumping station is optimal. In other words, the flow target value Fi from the first optimization step is here a boundary condition of the second optimization OPT2. From the operational status determined in this way operating parameters Ri for the respective pumping station can be derived and provided for the control of the pumping station.

Additionally, the determined efficiency value Eff can be used to update the regression model RM for the corresponding pumping station, in order to adapt this to the dynamic operational behavior of the water supply system.

Figure 3:
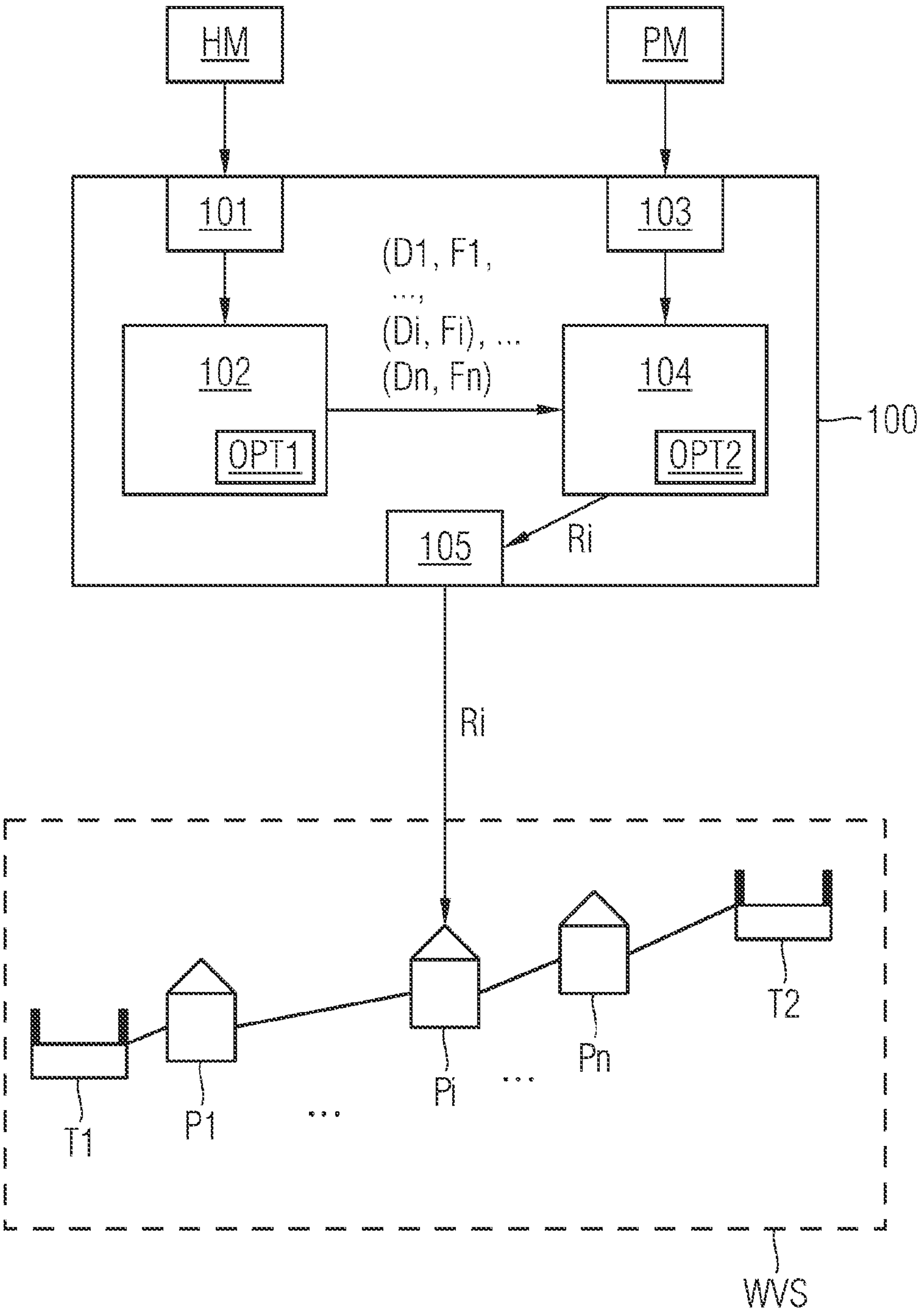
FIG. 3 shows an exemplary embodiment of a device.

FIG. 3 shows an exemplary embodiment of a device 100 for controlling the distribution of pressure and flow of a water supply system WVS, such as for example a pipeline. The water supply system comprises a plurality of pumping stations PS1, . . . , PSi, . . . , PSn and multiple tanks T1, T2. The device 100 is in particular designed so as to execute the steps of the methods as explained by way of example using FIGS. 1 and 2. The device and/or modules thereof can in particular be configured in software and/or hardware.

The device 100 comprises a first interface 101, which is designed to read in a computer-assisted hydraulic model HM of the water supply system WVS, wherein the computer-assisted hydraulic model HM is designed to map a time-dependent distribution of pressure and flow in the water supply system.

The device 100 further comprises a first optimization module 102, which is designed to determine resource-optimized pressure and flow target values (D1,F1), . . . , (Di,Fi), . . . , (Dn,Fn) for the pumping stations P1, . . . , Pn in the water supply system for a specified forecast period using the computer-assisted hydraulic model HM by a first method of optimization OPT1.

The device 100 further comprises a second interface 103, which is designed to read in a pumping model PM, such as for example a pump characteristic, for each pumping station P1, . . . , Pn. In this case the respective pumping model PM is designed to map an operational behavior of pumping devices in the respective pumping station, i.e., a different pumping model can in particular be read in for each pumping station.

The device 100 further comprises a second optimization module 104, which is designed to determine resource-optimized operating parameters Ri for the pumping devices in each pumping station using the pumping model PM at a specified time by a second method of optimization OPT2 as a function of the pressure and flow target value of this pumping station for the specified time. FIG. 3 shows by way of example the optimization for the pumping station Pi.

The resource-optimized operating parameters Ri for the pumping station Pi are output by an output module 105 of the device 100 for controlling the pumping devices in the pumping station.

For example, the resource-optimized operating parameters can be passed to a control unit of the water supply system in order to control the pumps accordingly.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented method for controlling the distribution of pressure and flow in a water supply system which comprises a plurality of pumping stations, comprising:

(a) reading in a computer-assisted hydraulic model of the water supply system, wherein the computer-assisted hydraulic model is configured to map a time-dependent distribution of pressure and flow in the water supply system, (b) determining resource-optimized pressure and flow target values for the plurality of pumping stations in the water supply system at a first optimization level, the first optimization level being for a specified forecast period, using the computer-assisted hydraulic model by a first method of optimization, (c) reading in a computer-assisted pumping model for a first pumping station, wherein the pumping model is configured to map an operational behavior of pumping devices in the first pumping station (d) determining resource-optimized operating parameters for the pumping devices in the first pumping station using the computer-assisted pumping model at a second optimization level, the second optimization level being at a specified time, by a second method of optimization as a function of the pressure and flow target value of the first pumping station for the specified time after the step of determining resource-optimized pressure and flow target values for the plurality of pumping stations, and (e) outputting the resource-optimized operating parameters for controlling the pumping devices in the first pumping station, wherein by the second method of optimization an efficiency value of the first pumping station is determined, the computer-assisted hydraulic model is updated using the efficiency value of the first pumping station and is used for determining the resource-optimized pressure and flow target values for the plurality of pumping stations in the water supply system, wherein the pumping devices in the first pumping station are controlled by the resource-optimized operating parameters.

2. The computer-implemented method as claimed in claim 1, wherein the resource-optimized pressure and/or flow target values of the first pumping station are used as boundary conditions for the second method of optimization.

3. The computer-implemented method as claimed in claim 1, wherein the operating parameters for the pumping devices are determined, such that the resource-optimized pressure and flow target values of the first pumping station are satisfied at the specified time.

4. The computer-implemented method as claimed in claim 1, wherein individual pumping devices in the first pumping station are selected as a function of the determined pressure and flow target value of the first pumping station and resource-optimized operating parameters are determined only for the selected pumping devices.

5. The computer-implemented method as claimed in claim 1, wherein steps (c) to (e) are performed for each pumping station of the plurality of pumping stations in the water supply system.

6. The computer-implemented method as claimed in claim 1, wherein steps (b) to (d) are iterated after a specified time step.

7. The computer-implemented method as claimed in claim 1, wherein the plurality of pumping stations in the water supply system are mapped in the computer-assisted hydraulic model of the water supply system by analogous models.

8. The computer-implemented method as claimed in claim 1, wherein the pumping model comprises pump characteristics of the pumping devices.

9. The computer-implemented method as claimed in claim 1, wherein the first optimization level is an upper level modeling individual pumping stations in less detail and wherein the second optimization level is a lower level modeling individual pumping stations in greater detail.

10. A device for controlling the distribution of pressure and flow of a water supply system which comprises a plurality of pumping stations, comprising:

a first interface, which is configured se as to read in a computer-assisted hydraulic model of the water supply system, wherein the computer-assisted hydraulic model is configured to map a time-dependent distribution of pressure and flow in the water supply system;

a first optimization module, which is configured to determine resource-optimized pressure and flow target values for the plurality of pumping stations in the water supply system at a first optimization level, the first optimization level being for a specified forecast period using the computer-assisted hydraulic model by a first method of optimization, a second interface, which is configured to read in a pumping model for a first pumping station, wherein the pumping model is configured to map an operational behavior of pumping devices in the first pumping station;

a second optimization module, which is configured to determine resource-optimized operating parameters for the pumping devices in the first pumping station using the pumping model at a second optimization level, the second optimization level being at a specified time, by a second method of optimization as a function of the pressure and flow target value of the first pumping station for the specified time after the resource-optimized pressure and flow target values for the plurality of pumping stations have been determined by the first optimization module; and an output module, which is configured to output the resource-optimized operating parameters for controlling the pumping devices in the first pumping station, wherein by the second method of optimization an efficiency value of the first pumping station is determined, the computer-assisted hydraulic model is updated using the efficiency value of the first pumping station and is used to determine the resource-optimized pressure and flow target values for the plurality of pumping stations in the water supply system, wherein the pumping devices in the first pumping station are controlled by the resource-optimized operating parameters.

11. A computer program product, comprising a non-transitory computer readable hardware storage device having computer readable program code stored therein, said program code executable by a processor of a computer system to implement the method according to claim 1.

* * * * *